United States Patent [19]

Andrews et al.

[11] Patent Number: 5,126,842
[45] Date of Patent: Jun. 30, 1992

[54] VIDEO SIGNAL ENCODING METHOD WITH A SUBSTANTIALLY CONSTANT AMOUNT OF TRANSFORM DATA PER TRANSMISSION UNIT BLOCK

[75] Inventors: Barry D. Andrews, Coquitlam, Canada; Yoichi Yagasaki; Jun Yonemitsu, both of Kanagawa, Japan

[73] Assignee: Sony Corporation, Tokyo, Japan

[21] Appl. No.: 634,078

[22] Filed: Dec. 26, 1990

[30] Foreign Application Priority Data

Dec. 30, 1989 [JP] Japan .................. 1-340266

[51] Int. Cl.⁵ .................. H04N 7/12; H04N 5/213
[52] U.S. Cl. .................. 358/133; 358/135; 358/167; 382/56
[58] Field of Search .................. 358/133, 135, 136, 11, 358/12, 167, 36; 382/56

[56] References Cited

U.S. PATENT DOCUMENTS

| | | | |
|---|---|---|---|
| 4,189,748 | 2/1980 | Reis | 358/133 |
| 4,672,441 | 6/1987 | Hoelzlwimmer et al. | 358/135 |
| 4,707,738 | 11/1987 | Ferre et al. | 358/136 |
| 4,894,713 | 1/1990 | Delogne et al. | 358/133 |
| 4,972,260 | 11/1990 | Fujikawa et al. | 358/135 |

*Primary Examiner*—John K. Peng
*Attorney, Agent, or Firm*—Alvin Sinderbrand; William S. Frommer

[57] ABSTRACT

A method of encoding a video signal into highly efficiently encoded data comprises the steps of: digitizing and blocking the video signal; performing a discrete cosine or Fourier transform on the blocked data; controlling the amount of data in each block to be substantially constant according to an amount of encoded data awaiting transmission; calculating a threshold amplitude; and selecting data larger in amplitude than the threshold amplitude as encoded data for transmission.

7 Claims, 2 Drawing Sheets

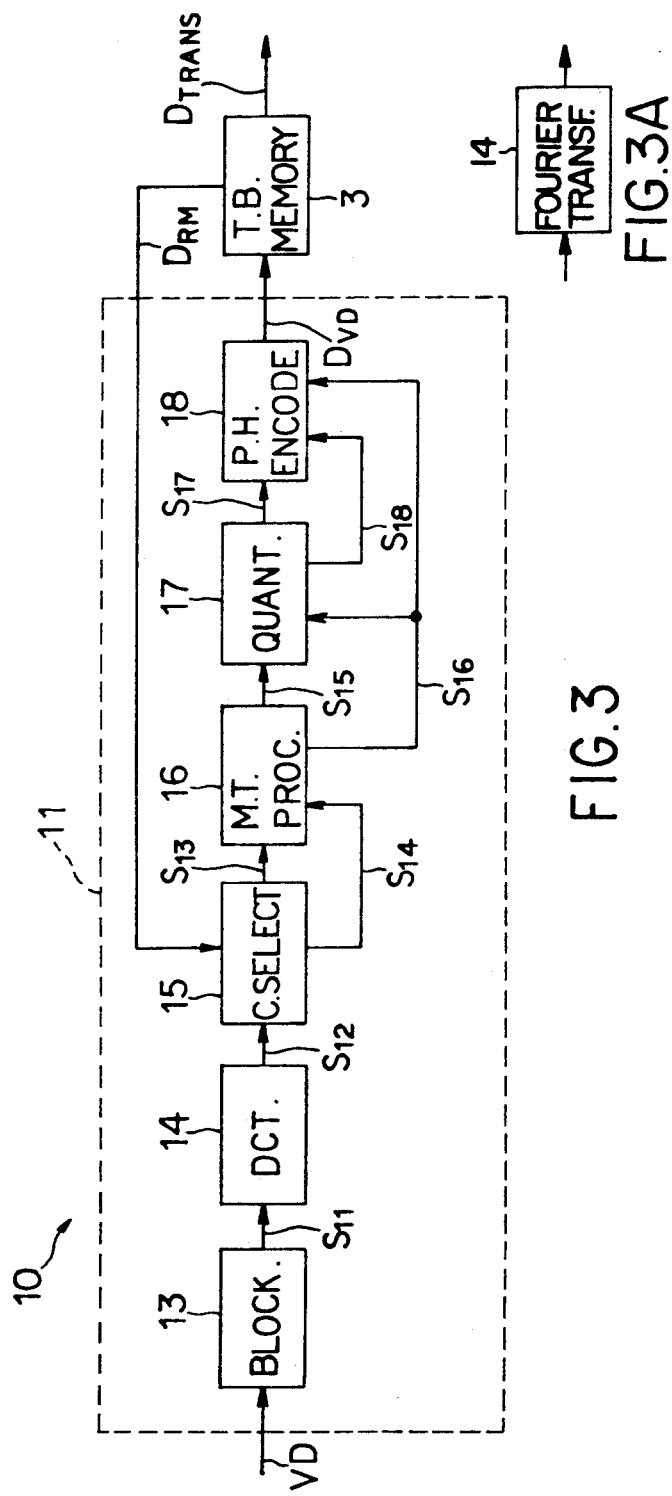
FIG.3
FIG.3A
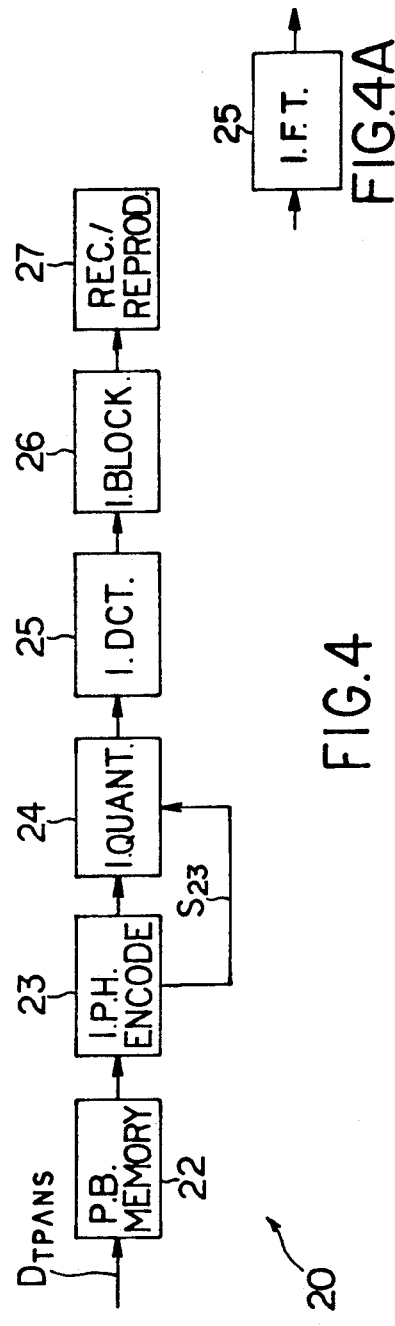
FIG.4
FIG.4A

VIDEO SIGNAL ENCODING METHOD WITH A SUBSTANTIALLY CONSTANT AMOUNT OF TRANSFORM DATA PER TRANSMISSION UNIT BLOCK

BACKGROUND OF THE INVENTION

The present invention relates to a video signal encoding method and is appropriately but not exclusively applied in transforming video signals to highly efficiently encoded data.

In a conventional video signal recorder, video signals are recorded on a recording medium such as a compact disk (CD) so that the signals can be randomly searched. In video conference systems and picture telephone systems, video signals are conventionally transmitted to a remote destination. In such recording and transmitting systems, a method has been proposed wherein each picture represented by a video signal is separated into blocks of a predetermined number of pixels, and the blocks then each undergo a discrete cosine transform (DCT) to produce encoded data. The transmission capacity of a transmission line is efficiently used when sending the encoded data.

In a DCT, original picture signals which correspond to each block of a picture are formed into two dimensional data arrays and are linearly transformed about a transform axis which is appropriate to the characteristic of the original picture signals. The resultant picture data of each block, in the form of an array of coefficient data are scanned in a zigzag manner and are then compressed Run-length Huffman encoding technique. The compressed data are sent and recorded.

To produce such transformed, encoded video signals for a recording medium, such as a CD, a video signal encoder 1 as illustrated in FIG. 1 is used. In the picture data generating system 1, video signal VD is quantized by a video signal encoding circuit 2 to produce an encoded data signal $D_{VD}$, which is then temporarily stored in a transmission buffer memory 3, from which the encoded data signal $D_{VD}$ is read out as a transmission data $D_{TRANS}$ at a predetermined transmission rate. The transmission data signal $D_{TRANS}$ is sent to a picture data recording and reproducing system 5, such as a CD player, through a transmission line 4 which constitutes a transmission system. At the same time, the transmission buffer memory 3 feeds back a data remaining signal $D_{RM}$, which represents an amount of data remaining in the buffer and awaiting transmission, to the video signal encoding circuit 2 through a feedback line. A quantizing step STEPG is controlled during encoder of the video signal VD (FIG. 2), so that the amount of quantized encoded data $D_{VD}$ does not overflow or underflow the capacity of the transmission buffer memory 3.

In the picture data recording and reproducing system 5, the transmission data signal $D_{TRANS}$ is decoded using an inverse run-length Huffman encoding algorithm, then inverse quantized and finally inverse discrete cosine transformed. In this manner, the original video signals are reconstructed.

In the video signal encoder 1, the quantizing circuit of the video signal encoding circuit 2 stepwise changes the quantizing step STEPG according to the amount of data remaining in the transmission buffer memory 3 so that the quantizing step STEPG becomes larger as the data occupancy rate: (data remaining)/(capacity) of transmission buffer memory 3 increases, that is, when the buffer is fairly full only coefficients which have large amplitudes are transmitted. For picture data recorded on a CD at a data rate of 1.1 Mbps, for example, fine patterns of a picture are not transmitted when the quantizing step STEPG is large, resulting in the picture not being reconstructed with excellent quality.

SUMMARY OF THE INVENTION

Accordingly, it is an object of the present invention to provide a method of encoding a video signal, which is capable of preventing pictures transmitted from being degraded in quality when a transmission buffer memory is maintained at a predetermined data occupancy rate.

It is another object of the present invention to provide a method of encoding a video signal which makes it possible to send and reconstruct fine patterns of pictures with noise removed.

With these and other objects in view, the present invention provides a of encoding a video signal for the transmission thereof, comprising the steps of: digitizing and blocking said video signal for producing blocks each having a time component; transforming the time component into a frequency component for producing transmission unit blocks of transmission data; controlling an amount of the transmission data to be substantially constant for each transmission unit block according to an amount of the transmission data produced by the step of transforming and an amount of the encoded transmission data awaiting transmission; calculating a threshold amplitude according to the amount of encoded transmission data awaiting transmission; and selecting transmission data larger in amplitude than the threshold amplitude, for constituting encoded transmission data for transmission.

BRIEF DESCRIPTION OF THE DRAWINGS

In the drawings:

FIG. 3 is a block diagram of a picture data generating system according to the present invention;

FIG. 3A is a block diagram illustrating a modification of the picture data generating system;

FIG. 4 is a block diagram of a picture data recording and reproducing system used in the present invention; and FIG. 4A is a block diagram illustrating a modification of the picture data recording and reproducing system;

DETAILED DESCRIPTION OF THE PREFERRED EMBODIMENTS

Figure 1:
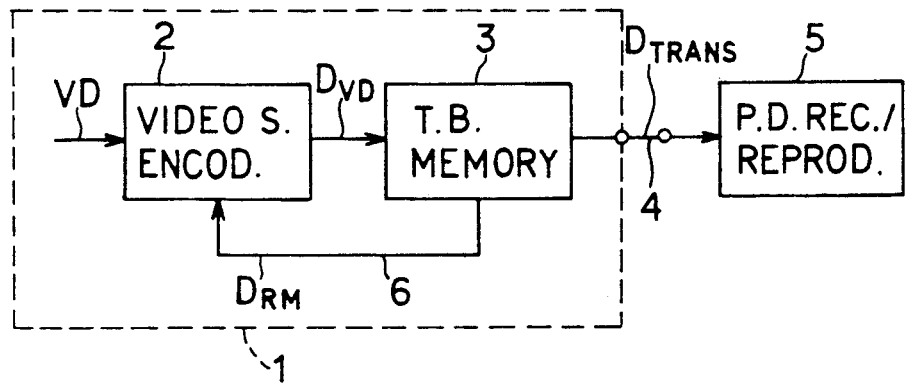
FIG. 1 is a block diagram of a conventional video signal encoder.
Figure 2:
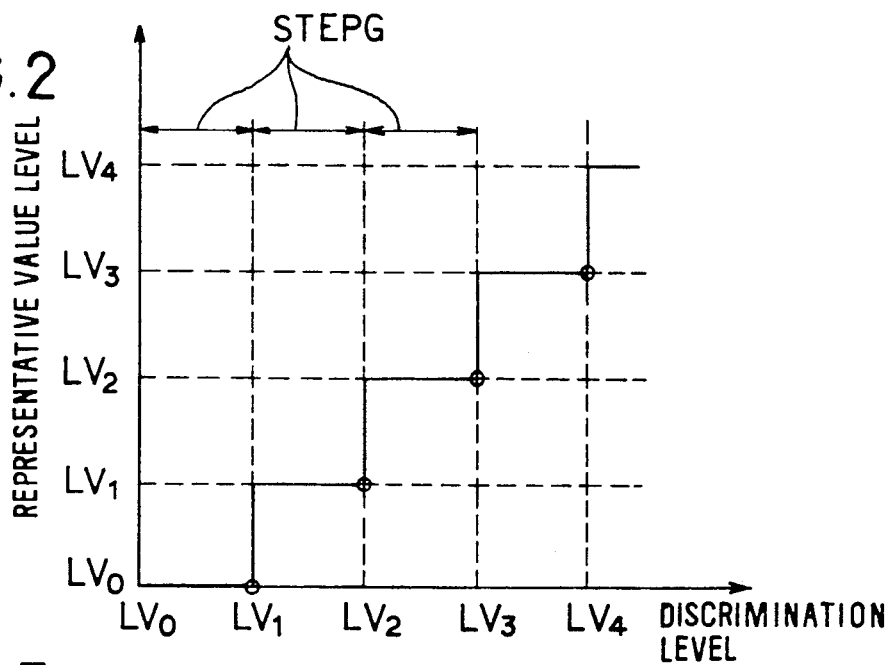
FIG. 2 is a graph illustrating the quantization step of the video signal encoder of FIG. 1.
Figure 5:
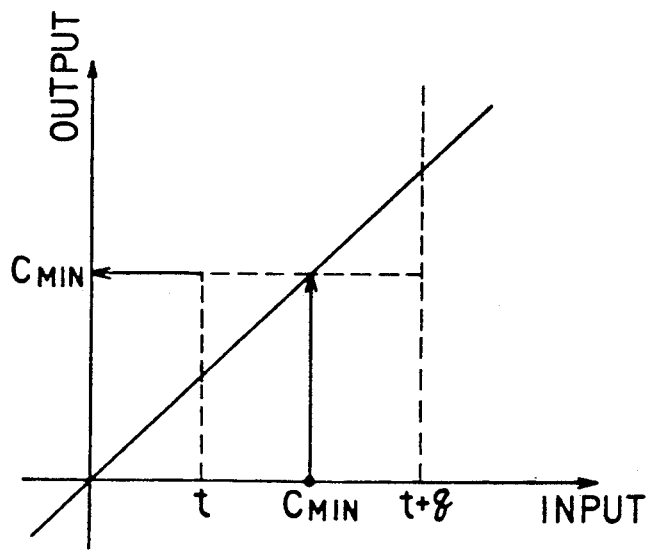
FIG. 5 is a graph showing how to determine a quantization width according to the present invention.

Referring to FIGS. 3 to 5, one embodiment of the present invention will be described. In FIG. 3, a transmission buffer memory 3 corresponds to the transmission buffer memory 3 of FIG. 1 and is hence designated by the same reference numeral.

As shown in FIG. 3, in a video signal encoding circuit 11 of a picture data generating system 10 a video signal VD is supplied to a blocking circuit 13, where the luminance signal and the chrominance signal thereof are converted to digital data and are then converted to moving picture data by dropping every other field thinning every other field line or similar processing. The moving picture data is transformed to a transmission unit block signal S11 by being grouped into blocks each having a predetermined number of pixels. The transmission unit block signal S11 is discrete cosine transformed in a discrete cosine transform circuit 14 to produce a transmission encoded signal S12. The transmission encoded signal S12 represent transmission data, that is, an array of discrete cosine transform coefficients DCT coefficients and is sent to a coefficient selection circuit 15.

The coefficient selection circuit 15 determines a transmission proportional coefficient number K of coefficients to be transmitted for each transmission unit block base on a data remaining signal $D_{RM}$ fed back from the transmission buffer memory 3. The data remaining signal $D_{RM}$ represents an amount of encoded transmission data awaiting transmission in the transmission buffer memory 3. The coefficient selection circuit 15 selects an amount, K, of transmission data, that is, discrete cosine transform coefficients, of the transmission encoded signal S12 in descending order from the largest coefficient and sends the selected coefficients as a coefficient signal S13 to a least threshold processing circuit 16. Furthermore, the coefficient selection circuit 15 calculates a data occupancy rate X of the transmission buffer memory 3 according to the data remaining signal $D_{RM}$. The data occupancy rate X is defined as the amount of encoded transmission data awaiting transmission in the transmission buffer memory over the storage capacity of the buffer. The data occupancy rate X is sent as a minimum threshold indication signal S14 to the minimum threshold processing circuit 16.

The minimum threshold processing circuit 16 determines a minimum threshold amplitude $T_{MIN}$ on the basis of the minimum threshold indication signal S14 according to the following equation:

$$T_{MIN} = \beta \cdot X \quad (1)$$

where $\beta$ is a proportional constant. The minimum threshold processing circuit 16 selects and outputs only the transmission (coefficient) data larger than the minimum threshold amplitude $T_{MIN}$ as a threshold processed signal S15 to a quantizing circuit 17, where the threshold processed signal S15 is quantized. At the same time, the minimum threshold processing circuit 16 determines a dead zone defined by the following equation:

$$0 < t < C_{MIN} \quad (2)$$

where $C_{MIN}$ is the minimum amplitude of the coefficient data of the threshold processed signal S15. The minimum threshold processing circuit 16 sends the dead zone t as a dead zone signal S16 to the quantizing circuit 17 and a run-length Huffman encoding circuit 18.

In the quantizing circuit 17, a quantization width q is calculated using the following equation:

$$t + (q/2) = C_{MIN} \quad (3)$$

As illustrated in FIG. 5 the threshold processed signal S15 is quantized according to the quantization width q to produce a quantized signal S17. The quantizing circuit 17 also sends the quantization width q as a quantized step signal S18 to the run-length Huffman encoding circuit 18.

The quantized signal S17 and quantized step signal S18 are supplied to the run-length Huffman encoding circuit 18, where the quantized signal S17 is encoded again according to the dead zone signal S16 and the quantized step signal S18. The run-length Huffman encoded data is transmitted as an encoded transmission data signal $D_{VD}$ to the transmission buffer memory 3.

The transmission buffer memory 3 outputs a transmission data signal $D_{TRANS}$ to a picture data recording and reproducing system 20 (FIG. 4) at a transmission rate which depends on the transmission capacity of the transmission line and at the same time feeds back to the coefficient selection circuit 15 the data remaining signal $D_{RM}$ through a feedback line.

In the coefficient selection circuit 15, the transmission proportional coefficient number K is calculated from the data occupancy rate X which is obtained from the data remaining signal $D_{RM}$ according to the following equation:

$$K = \alpha(1 - X) \quad (4)$$

where $\alpha$ is a feedback sensitivity. The transmission proportional coefficient number K is within a range defined by the following equation:

$$0 < K < S \quad (5)$$

where S is a transmission unit block size. In this embodiment, $S = 8 \times 8$.

It is possible to prevent data in the transmission buffer memory 3 from overflowing or underflowing by calculating the transmission proportional coefficient number K for the transmission encoded signal S12, from the data occupancy rate X of the proportional coefficient buffer memory 3.

The transmission number K is substantially proportional to the amount of data actually produced by the run-length Huffman encoding circuit 18 when the feedback sensitivity is chosen properly. Thus, it is possible to make the amount K of coefficients to be transmitted for each transmission unit block substantially equal.

Noise, which contains high frequency components is removed by not transmitting of coefficients having amplitudes below the minimum threshold amplitude from the minimum threshold processing circuit 16.

In the picture data recording and reproducing system 20, the transmission data signal $D_{TRANS}$ which is sent from the picture data generating system 10 through the transmission line is temporarily stored in a receiving buffer memory 22 and is then transmitted to an inverse run-length Huffman encoding circuit 23 at a predetermined transmission rate.

The inverse run-length Huffman encoding circuit 23 performs inverse processing relative to processing done by the run-length Huffman encoding circuit 18. Thus, the input data of the run-length Huffman encoding circuit 18 is reconstructed and is outputted to the inverse quantizing circuit 24. At the same time, the inverse run-length Huffman encoding circuit 23 reconstructs the dead zone t and the quantization width q which have been calculated in the minimum threshold processing circuit 16 and the quantizing circuit 17 and outputs the reconstructed data as a quantization width signal S23 to the inverse quantizing circuit 24.

The inverse quantizing circuit 24 performs inverse processing relative to the quantization done by the quantizing circuit 17, and thus reconstructs the input data of the quantizing circuit 17 which is sent to an inverse discrete cosine transform circuit 25.

The inverse discrete cosine transform circuit 25 performs inverse processing relative to the transform done by the discrete cosine transform circuit 14 (FIG. 3), and thus reconstructs the input data of the discrete cosine transform circuit 14.

The output data from the inverse discrete cosine transform circuit 25 is inverse blocked in an inverse blocking circuit 26 relative to the blocking done by the blocking circuit 13, and thereby the video signal VD inputted to the blocking circuit 13 is reconstructed. The reconstructed signal is sent to a recording and reproducing circuit 27 for recording or reproducing.

In a case where the data occupancy rate X of the transmission buffer memory 3 is approximately controlled to 0.80, the transmission proportional coefficient number K of coefficients to be transmitted from the transmission encoded signal S12 is selected to be about 40 according to equation (4) for a feedback sensitivity $\alpha$ of 200 of the transmission buffer memory 3. The minimum threshold processing circuit 16 thus selects 40 transmission coefficients each larger in amplitude than the minimum threshold amplitude $T_{MIN} = 8$ calculated according to equation (1) for $\beta = 10$. The quantization width q is calculated in the quantizing circuit 17. In this embodiment, the quantization width q is defined by the following equation:

$$q = 2 \cdot t \quad (6)$$

According to this technique, a fine pattern of a picture can be transmitted and reconstructed.

In the embodiment above described, the amount of discrete cosine transform coefficients is controlled to be substantially constant for each transmission unit block, and the minimum threshold processing circuit 16 does not send discrete cosine transform coefficients which are smaller in amplitude than the predetermined threshold amplitude. It is thus possible to send and reconstruct fine patterns of pictures with noise removed.

In the transmission proportional coefficient video signal coding method previously described, the number K of discrete cosine transform coefficients to be transmitted is set substantially constant for each transmission unit block, and thereby even in a case where picture data are recorded in a CD at a data transmission rate of 1.1 Mbps a fine pattern of a picture may be reconstructed with a fairly high picture quality as compared to the conventional method in which the number of the coefficients to be transmitted is determined on the basis of a quantization width changed stepwise according to a data occupancy rate of the transmission buffer memory 3.

Although in this embodiment, video signals are transmitted for each field, the present invention may be applied to a case, as proposed in Japanese Patent Application No. 1(1989)-267051, where intra coded frames and interpolated frames which are produced by high efficiency encoding of video signals of a motion picture.

In this embodiment, the present invention is applied to a case where moving pictures are recorded by a picture data recording and reproducing system, but the present invention may also be applied to a video signal transmission system, such as a television conference system and a television telephone system where video signals of a moving picture are transmitted to a remote destination.

In the video signal encoding method previously described, picture data are discrete cosine transformed and then transmitted but the present invention may be applied to cases where picture data are Fourier transformed or the time component of the picture data is transformed to a frequency component. FIGS 3A and 4A show the modifications to FIGS. 3 and 4, respectively, when the picture data are Fourier transformed.

The video signal encoding method of the present invention is not limited to a case where picture data are recorded by the picture data recording and reproducing system of a CD. The present invention may be widely applied to picture data transmission systems in which digital video signals are encoded with high efficiency for transmission.

Although an illustrative embodiment of the present invention, and various modifications thereof, have been described in detail herein with reference to the accompanying drawings, it is to be understood that the invention is not limited to this precise embodiment and the modifications, and that various changes and further modifications may be effected therein be one skilled in the art without departing from the scope or spirit of the invention as defined in the appended claims.

What is claimed is:

1. A method of encoding a video signal for the transmission thereof, comprising the steps of:

digitizing and blocking said video signal for producing blocks each having a time component;

transforming said time component into a frequency component for producing transmission unit blocks of transmission data;

controlling an amount of said transmission unit data to be substantially constant for each transmission unit block according to an amount of said transmission data produced by the steps of transforming and according to a data occupancy rate based on an amount of encoded transmission data awaiting transmission;

calculating a threshold amplitude according to said amount of encoded transmission data awaiting transmission; and selecting transmission data larger in amplitude than said threshold amplitude, for constituting encoded transmission data for transmission.

2. A method of encoding a video signal according to claim 1, wherein the step of selecting includes calculating a dead zone value based on a minimum amplitude of said transmission unit data, and further comprising the steps of:

quantizing said transmission data larger in amplitude than said threshold amplitude as quantized transmission data using a quantizing width value based on said dead zone value; and run-length Huffman encoding said quantized transmission data as the encoded transmission data for transmission in accordance with said dead zone value and said quantizing width value;

and wherein said controlling is also according to a feedback sensitivity factor based on said step of run-length Huffman encoding.

3. A method of encoding a video signal for the transmission thereof, comprising the steps of:

digitizing and blocking said video signal for producing blocks each having a time component;

transforming said time component into a frequency component for producing transmission unit blocks of transmission data;

controlling an amount of said transmission unit data to be substantially constant for each transmission unit block according to an amount of said transmission data produced by the step of transforming and an amount of encoded transmission data awaiting transmission, including calculating a data occupancy rate according to said amount of encoded transmission data awaiting transmission;

calculating a threshold amplitude according to said amount of encoded transmission data awaiting transmission, including determining said threshold amplitudes according to the calculated data occupancy rate; and selecting transmission data larger in amplitude than said threshold amplitude, for constituting encoded transmission data for transmission.

4. A method of encoding a video signal for the transmission thereof, comprising the steps of:

digitizing and blocking said video signal for producing blocks each having a time component;

transforming said time component into a frequency component for producing tramnsmission unit blocks of transmission data;

controlling an amount of said transmission unit data to be substantially constant for each transmission unit block accroding to an amount of said transmission data produced by the step of transforming and an amount of encoded transmission data awaiting transmission, including determining a transmission proportional coefficient number for each transmission unit block according to said amount of encoded transmission data awaiting transmission, and selecting for transmission an amount substantially equal to said transmission proportional coefficient number of said transmission data produced by the step of transforming in a descending order of amplitude;

calculating a threshold amplitude according to said amount of encoded transmission data awaiting transmission; and selecting transmission data larger in amplitude than said threshold amplitude for constituting encoded transmission data for transmission.

5. A method of encoding a video signal according to claim 4, wherein said controlling includes calculating a data occupancy rate according to said amount of encoded transmission data awaiting transmission; and said calculating includes determining said threshold amplitude according to the calculated data occupancy rate.

6. A method of encoding a video signal according to claim 4, wherein the step of transforming includes performing a discrete cosine transform on said time component.

7. A method of encoding a video signal according to claim 4, wherein the step of transforming includes performing a Fourier transform on said time component.

* * * * *